US011238166B2

(12) United States Patent
Schramm et al.

(10) Patent No.: US 11,238,166 B2
(45) Date of Patent: Feb. 1, 2022

(54) DATA PROCESSING DEVICE AND OPERATING METHOD THEREFOR

(71) Applicant: Robert Bosch GmbH, Stuttgart (DE)

(72) Inventors: Juergen Schramm, Bietigheim-Bissingen (DE); Andreas Soenkens, Remseck Am Neckar (DE); Bjoern Kasper, Ingersheim (DE)

(73) Assignee: Robert Bosch GmbH, Stuttgart (DE)

( * ) Notice: Subject to any disclaimer, the term of this patent is extended or adjusted under 35 U.S.C. 154(b) by 70 days.

(21) Appl. No.: 16/418,505

(22) Filed: May 21, 2019

(65) Prior Publication Data

US 2019/0362082 A1 Nov. 28, 2019

(30) Foreign Application Priority Data

May 23, 2018 (DE) .......................... 102018208066.6

(51) Int. Cl.
*G06F 21/60* (2013.01)
*G06F 21/62* (2013.01)
*G06F 21/70* (2013.01)

(52) U.S. Cl.
CPC .......... *G06F 21/602* (2013.01); *G06F 21/606* (2013.01); *G06F 21/62* (2013.01); *G06F 21/70* (2013.01)

(58) Field of Classification Search
CPC ...... G06F 21/602; G06F 21/606; G06F 21/62; G06F 21/70
See application file for complete search history.

(56) References Cited

U.S. PATENT DOCUMENTS

| | | | | |
|---|---|---|---|---|
| 9,225,695 B1* | 12/2015 | Riera | ..................... | H04L 63/101 |
| 10,515,236 B1* | 12/2019 | Yu | .......................... | G06F 21/602 |
| 2004/0193763 A1* | 9/2004 | Iizuka | ................... | H04L 9/0643 |
| | | | | 710/52 |
| 2007/0180228 A1* | 8/2007 | Mattsson | .............. | H04L 9/0625 |
| | | | | 713/156 |
| 2009/0144482 A1* | 6/2009 | Tankleff | ................ | G06F 9/5077 |
| | | | | 711/6 |
| 2011/0093720 A1* | 4/2011 | Thomas | ................ | G06F 21/602 |
| | | | | 713/189 |
| 2012/0210124 A1* | 8/2012 | Lieber | ..................... | H04L 9/321 |
| | | | | 713/158 |
| 2014/0136835 A1* | 5/2014 | Sharpe | .................. | H04L 63/145 |
| | | | | 713/153 |
| 2014/0229744 A1* | 8/2014 | Doumen | ............... | G06F 21/125 |
| | | | | 713/190 |
| 2016/0321456 A1* | 11/2016 | Schuman | ................ | G06F 16/22 |
| 2016/0380985 A1* | 12/2016 | Chhabra | ............. | H04L 63/0876 |
| | | | | 713/171 |
| 2017/0118018 A1* | 4/2017 | Dekker | .................. | H04L 9/3249 |
| 2017/0187699 A1* | 6/2017 | Gillmore | ............... | H04W 12/06 |
| 2018/0287792 A1* | 10/2018 | Fu | .......................... | H04L 9/0822 |
| 2018/0337776 A1* | 11/2018 | Miller | ................... | H04L 9/3247 |
| 2019/0052610 A1* | 2/2019 | Pohanka | ............. | H04L 63/0853 |

OTHER PUBLICATIONS

Federal Information Processing Standards Publication 197, Nov. 26, 2001, <https://doi.org/10.6028%2FNIST.FIPS.197>.

\* cited by examiner

*Primary Examiner* — Tongoc Tran
(74) *Attorney, Agent, or Firm* — Norton Rose Fulbright US LLP; Gerard Messina

(57) ABSTRACT

Data processing device, in particular, for a control unit, the data processing device including at least one computing device, a memory device, a hardware security module and at least one cryptography module.

16 Claims, 4 Drawing Sheets

DATA PROCESSING DEVICE AND OPERATING METHOD THEREFOR

FIELD OF THE INVENTION

The present invention relates to a data processing device, in particular, for a control unit, the data processing device including at least one computing device and one memory device.

The present invention further relates to an operating method for such a data processing device.

BACKGROUND INFORMATION

Data processing devices of the aforementioned type are known and exhibit comparatively little flexibility and security.

SUMMARY

Accordingly, an object of the present invention is to improve a data processing device of the aforementioned type and a corresponding operating method to the extent that increased flexibility and security is provided.

This object is achieved by a data processing device of the aforementioned type according to preferred specific embodiments, in that the data processing device includes a hardware security module and at least one cryptography module. This provides increased flexibility, in particular during the operation of the data processing device. The cryptography module may preferably operate at least temporarily independently of the hardware security module, so that also chronologically overlapping, different data processing tasks, in particular, may be handled by the hardware security module on the one hand and by the cryptography module on the other hand. In other preferred specific embodiments, it is conceivable, for example, that the hardware security module assumes configuration tasks, in particular for cryptographic calculations or for the preparation of cryptographic calculations, while cryptographic calculations themselves are carried out preferably, for example, by the cryptography module and, in this case, in particular, independently of or without the involvement of the hardware security module.

In other preferred specific embodiments, it is provided that a first data bus is provided for exchanging data between components of the data processing device. This may, for example, be a system bus of the data processing device or of a target system, into which the data processing device is integratable. The target system may, for example, be a control unit.

In other preferred specific embodiments, it is provided that the at least one cryptography module is designed, preferably completely, as hardware circuitry, the at least one cryptography module being situated externally to the hardware security module. This enables on the one hand a particularly efficient data processing by the cryptography module and, on the other hand, provides increased security and scalability (for example by providing multiple cryptography modules).

In other preferred specific embodiments, it is provided that the at least one cryptography module includes a first data interface for exchanging data via the first data bus, for example, a system bus. This enables an efficient exchange of data with other components connected to the first data bus.

In other preferred specific embodiments, it is provided that the at least one cryptography module includes a second data interface for directly exchanging data with the hardware security module. This provides a particularly secure option for exchanging data with the hardware security module. Components (besides the hardware security module), optionally connected to the first data bus or system bus are, in particular, unable to access the cryptography module via the second data interface. As a result, a separation of a safety domain from a security domain, in particular, is achieved, since a separation on the hardware side is implemented by the first data interface and the second data interface differing therefrom.

In other preferred specific embodiments, it is provided that the at least one cryptography module includes at least one of the following components: a primary cryptography unit for carrying out at least one first cryptographic function, a processing unit, in particular, a comparator unit for carrying out at least one second cryptographic and/or another function (for example, comparison), a key memory device for storing at least temporarily cryptographic keys, an interrupt control unit, a rule monitoring unit, a control register, a status register, a data buffer.

In other preferred specific embodiments, it is provided that the first cryptographic function includes at least one of the following elements: a) AES algorithm, in particular, AES algorithm according to the Federal Information Processing Standards Publication 197, Nov. 26, 2001, https://doi.org/10.6028%2FNIST.FIPS.197, b) CMAC, Cipher-Based Message Authentication Code, c) ECB Electronic code book mode, d) CBC, Cipher block chaining mode, e) CTR, Counter mode, f) OFB, Output feedback mode, g) CFB, Cipher feedback mode, h) GCM, Galois counter mode.

In other preferred specific embodiments, it is provided that the hardware security module is designed to exchange data with the at least one cryptography module via a second data bus. The provision of the second data bus enables a secure data transmission between the hardware security module and the cryptography module, in particular, fully independently of the first data bus or system bus.

Additional features, potential applications and advantages of the present invention result from the following description of exemplary embodiments of the present invention, which are depicted in the figures of the drawing. All described or depicted features in this case form by themselves or in arbitrary combination the subject matter of the present invention, regardless of their combination in the claims or their back-reference and regardless of their wording or depiction in the description or in the drawing.

DETAILED DESCRIPTION

Figure 1:
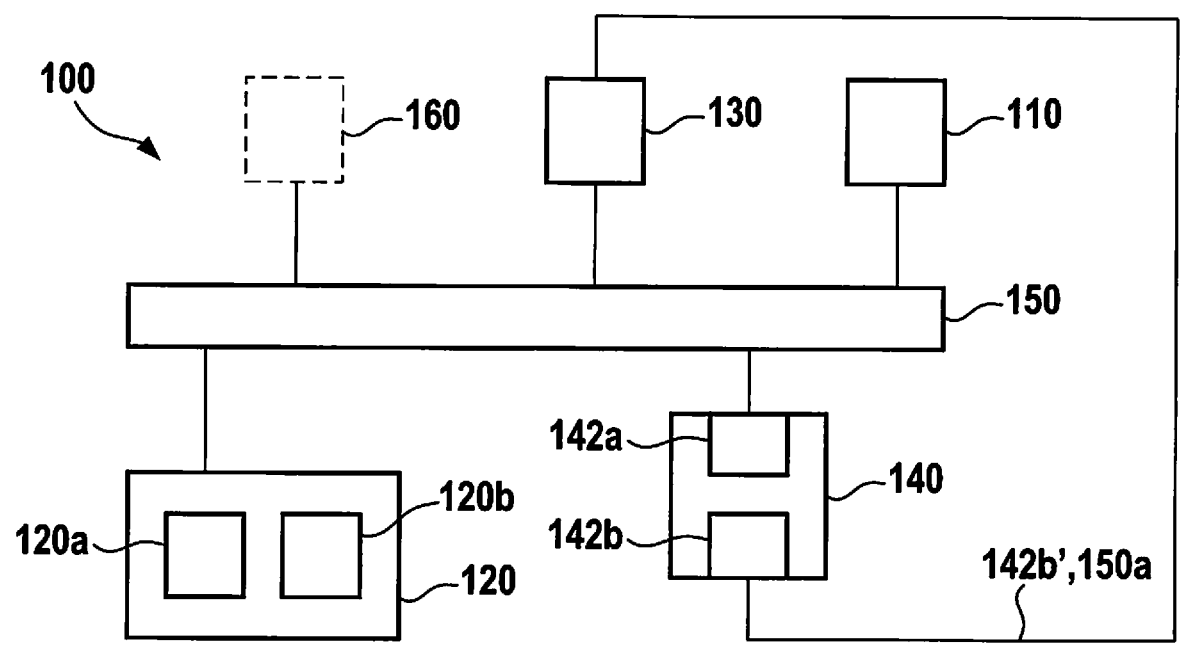
FIG. 1 schematically shows a simplified block diagram of a data processing device according to one specific embodiment.

FIG. 1 schematically shows a simplified block diagram of a data processing device 100 according to one specific embodiment. Data processing device 100 includes at least one computing device 110 and one memory device 120. Computing device 110 may include one or multiple processor cores or processors in a manner known per se, which is/are designed for executing software, for example, computer programs. Memory device 120 preferably includes a volatile memory, in particular, a working memory, 120a and a non-volatile memory, for example, a Flash EEPROM memory 120b.

Data processing device 100 further includes a hardware security module 130, which is designed to carry out cryptographic methods and/or for supporting other components in carrying out cryptographic methods, for example, for securing or checking messages, which are exchanged between data processing device 100 or a target system containing data processing device 100 and another unit (not shown). This may be, in particular, the case in preferred specific embodiments when data processing device 100 is utilized in a control unit for a motor vehicle. Because of the ever increasing communication relationships inside and outside the motor vehicle, the safeguarding of individual vehicle messages with the aid of cryptographic mechanisms such as authentication and/or encryption inside the motor vehicle in the control unit network is advantageous. This approach is summarized under secure communication. It relates to the reception (verification) and the sending (generation) of authentic or authenticatable messages. In preferred specific embodiments, hardware security module 130 may accordingly be utilized for supporting the secure communication inside a control unit or between various control units.

In other particularly preferred specific embodiments, hardware security module 130 may, for example, be used for the calculation of a clear fingerprint value (for example, symmetrical cryptography based on the AES 128 CMAC method) for secure communication. In this way, an encapsulation of a security domain of the target system or control unit with its cryptographic keys and security functions from the outer "unsecure" (in particular, in terms of security) safety domain may be achieved. In other more particularly preferred specific embodiments, hardware security module 130 may include an optional hardware accelerator ("ABS accelerator") for the aforementioned type of cryptographic calculations cited by way of example.

In other particularly preferred specific embodiments, the flexibility of data processing device 100 may be advantageously increased in that in addition to hardware security module 130, at least one separate, i.e., for example, not integrated into hardware security module 130, cryptography module 140 is provided.

As a result, even further increased flexibility is provided, in particular, during the operation of data processing device 100. Cryptography module 140 may preferably operate at least temporarily independently of hardware security module 130, so that also temporarily overlapping, different data processing tasks, in particular, may be handled by hardware security module 130 on the one hand and by cryptography module 140 on the other hand. In other preferred specific embodiments, it is conceivable, for example, that hardware security module 130 assumes configuration tasks, in particular, for cryptographic calculations, while cryptographic calculations themselves are carried out preferably, for example, by cryptography module 140 and, in this case, in particular, independently of or without the involvement of hardware security module 130.

In other preferred specific embodiments, it is provided that a first data bus 150 is provided for exchanging data between components 110, 120, 130, 140 of data processing device 100. This may, for example, be a system bus of data processing device 100 or of a target system (control unit), into which data processing device 100 is integratable.

Optionally, a device 160 for debugging may also be provided, which includes, for example, a debug interface or dedicated debug hardware. In other specific embodiments, device 160 may, for example, be connected via system bus 150 to the other components of data processing device 100.

In other preferred specific embodiments, it is provided that the at least one cryptography module 140 is designed, in particular, completely, as hardware circuitry, the at least one cryptography module 140 being situated externally to hardware security module 130. This enables, on the one hand, a particularly efficient data processing by cryptography module 140 and, on the other hand, provides increased security and scalability (for example by optionally providing multiple cryptography modules 140).

In other preferred specific embodiments, it is provided that the at least one cryptography module 140 includes a first data interface 142a for exchanging data via first data bus 150, for example, a system bus. This enables an efficient exchange of data with other components 110, 120, 130 connected to first data bus 150.

In other preferred specific embodiments, it is provided that the at least one cryptography module 140 includes a second data interface 142b for directly exchanging data, cf. line 142b', with hardware security module 130. This provides a particularly secure option for exchanging data with hardware security module 130. Components (besides hardware security module 130), optionally connected to first data bus 150 or system bus are, in particular, unable to access cryptography module 140 via second data interface 142b.

In other preferred specific embodiments, which are described by way of example below with reference to configuration 1400 according to FIG. 2, it is provided that the at least one cryptography module 140 (FIG. 1) includes at least one of the following components: a primary cryptography unit 1410 for carrying out at least one first cryptographic function, a processing unit, in particular, a comparator unit 1420 for carrying out at least one second cryptographic function and/or another function (for example, comparison), a key memory device 1430 for storing at least temporarily cryptographic keys, an interrupt request control unit 1440, a rule monitoring unit 1450, a control register 1460a, a status register 1460b, data buffers 1470a, 1470b.

Figure 2:
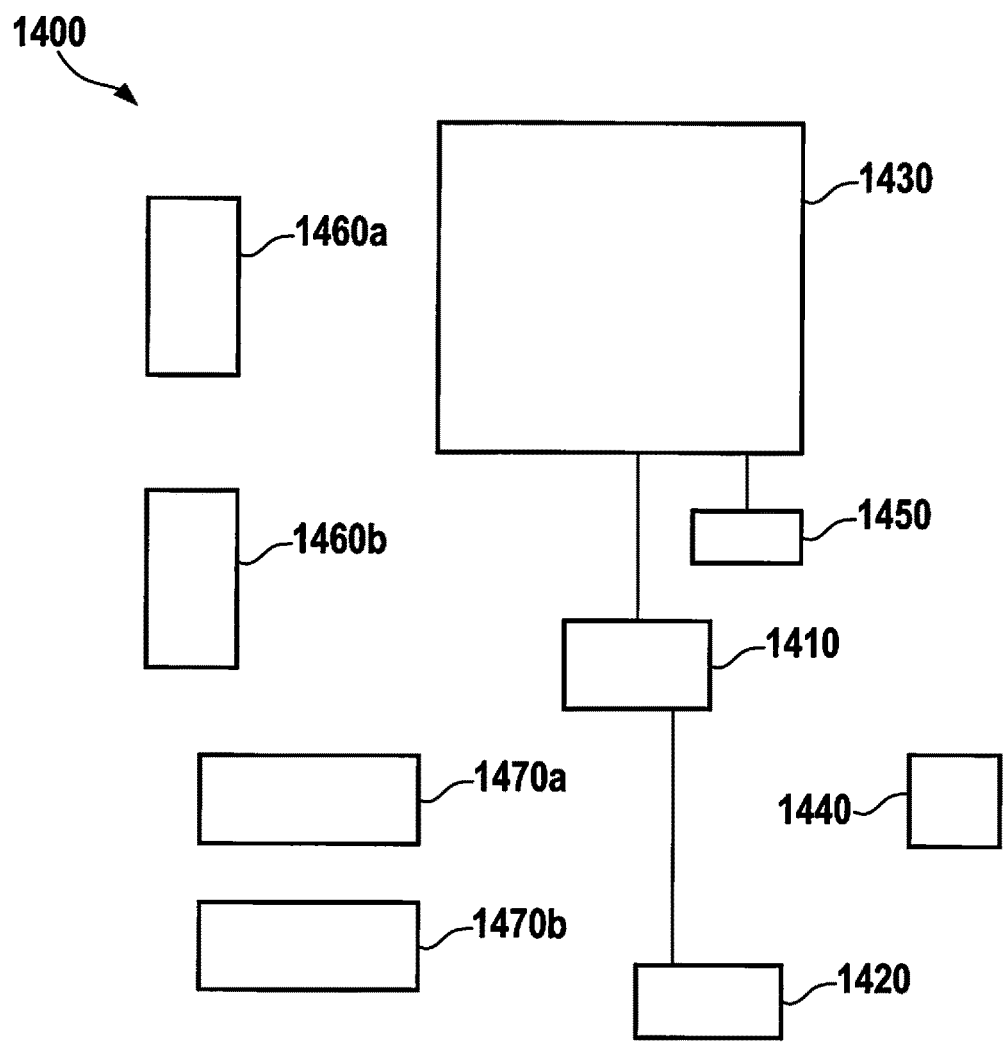
FIG. 2 schematically shows a simplified block diagram of a cryptography module according to one specific embodiment.

In other preferred specific embodiments, the at least one cryptography module 140 from FIG. 1 may, for example, include configuration 1400 depicted in FIG. 2. In other specific embodiments, it is conceivable that cryptography module 140 includes only one or multiple of the components depicted in FIG. 2, but not all of the components of configuration 1400 depicted by way of example in FIG. 2.

In other preferred specific embodiments, it is provided that the first cryptographic function (executable, in particular, by primary cryptography unit 1410 (FIG. 2)), includes at least one of the following elements: a) AES algorithm, in particular, AES algorithm according to the Federal Information Processing Standards Publication 197, Nov. 26, 2001, https://doi.org/10.6028%2FNIST.FIPS.197, b) CMAC, Cipher-Based Message Authentication Code, c) ECB, Electronic code book mode, d) CBC, Cipher block chaining mode, e) CTR, Counter mode, f) OFB, Output feedback mode, g) CFB, Cipher feedback mode, h) GCM, Galois counter mode.

In other preferred specific embodiments, it is provided that hardware security module 130 is designed to exchange data with the at least one cryptography module 140 via a second data bus 150a (FIG. 1). The provision of second data bus 150a enables a particularly secure data transmission between hardware security module 130 and cryptography module 140, in particular, fully independently of first data bus 150 or system bus.

Figure 3:
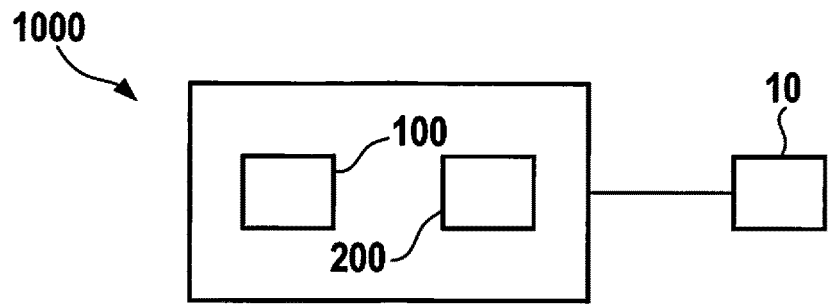
FIG. 3 schematically shows a simplified block diagram of a control unit according to one specific embodiment.

FIG. 3 schematically shows a simplified block diagram of a control unit 1000 as a target system for data processing device 100 according to the specific embodiments. Control unit 1000 is useable, for example, for a motor vehicle, for example for controlling an operation of an internal combustion engine 10 of the motor vehicle. Control unit 1000 may have additional components 200. The functionalities provided by data processing device 100, in particular, with respect to carrying out cryptographic functions, may be advantageously utilized by control unit 1000 or by its additional components 200. This enables, in particular, a safeguarded communication, for example, within additional components 200 and/or with external components (not shown) such as, for example, additional control units of the motor vehicle.

Figure 4:
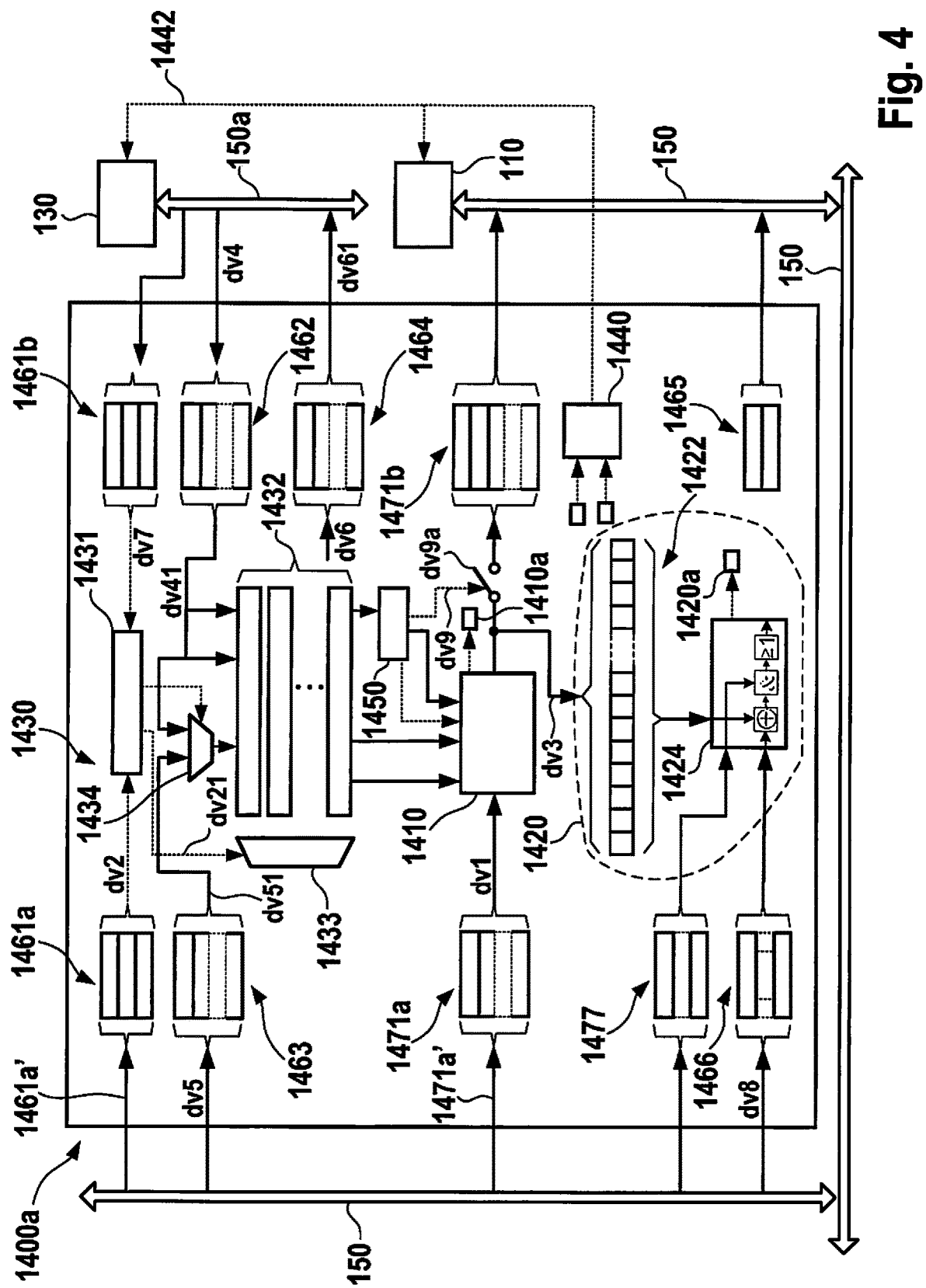
FIG. 4 schematically shows a simplified block diagram of a cryptography module according to another specific embodiment.

FIG. 4 schematically shows a cryptography module 1400a according to another specific embodiment. In some specific embodiments, cryptography module 140 according to FIG. 1 or cryptography module 1400 according to FIG. 2 may, for example, include the configuration or at least parts thereof described below with reference to FIG. 4. Cryptography module 1400a is particularly preferably implemented completely in hardware.

Cryptography module 1400a includes a primary cryptography unit 1410, which is designed similarly to primary cryptography unit 1410 according to FIG. 2. In other words, primary cryptography unit 1410 according to FIG. 4 is designed to carry out at least a first cryptographic function, the first cryptographic function including at least one of the following elements: a) AES algorithm, in particular, AES algorithm according to the Federal Information Processing Standards Publication 197, Nov. 26, 2001, https://doi.org/10.6028%2FNIST.FIPS.197, b) CMAC Cipher-Based Message Authentication Code, c) ECB, Electronic code book mode, d) CBC, Cipher block chaining mode, e) CTR, Counter mode, f) OFB, Output feedback mode, g) CFB, Cipher feedback mode, h) GCM, Galois counter mode. In other words, primary cryptography unit 1410 in other preferred specific embodiments is designed to carry out one or multiple of the aforementioned cryptographic functions, in particular, AES modes.

In other preferred specific embodiments, the aforementioned cryptographic functions, in particular, AES modes, are configurable with the aid of at least one control register 1461a. This may preferably take place, for example, in that computing device 110 accesses by writing and/or reading the at least one control register 1461a via first data bus 150, see arrow 1461a'.

In other preferred specific embodiments, a data buffer 1471a, preferably in the form of at least one register, is provided in that, for example, input data for carrying out the first cryptographic function are storable, at least temporarily by primary cryptography unit 1410. A local, parallel data bus or a parallel data connection dv1 is preferably provided, in order to transmit the data from data buffer 1471a into primary cryptography unit 1410. The input data may preferably be written by computing device 110 into data buffer 1471a via first data bus 150, see arrow 147a'. If carrying out the first cryptographic function requires a padding, for example, of the input data, this may preferably be carried out by computing device 110, for example, a so-called 10^n-padding for a last block in the case of a CMAC calculation.

Computing device 110, by a writing of corresponding control data into control register 1461a, may further preferably control which of multiple possible cryptographic functions (for example, CMAC, AES encryption, AES decryption, etc.) is to be carried out by the primary cryptography unit 1410. The carrying out of the cryptographic function may particularly preferably also be automatically started by primary cryptography unit 1410, once the corresponding control data have been written into control register 1461a.

A cryptographic key and, optionally, a corresponding context associated with the cryptographic key may further preferably be selected for carrying out a cryptographic function by primary cryptography unit 1410. This may preferably take place as a function of the selected cryptographic function (for example, via specification of the control data in control register 1461a).

Optionally, a key memory device 1430 is provided, which includes an access and priority control device 1431. Multiple cryptographic keys and, optionally, contexts associated herewith, are storable in key memory device 1430. A total of three sets of key data 1432 are cited by way of example in FIG. 4, each set of key data including, for example, at least one cryptographic key, an associated context ("key context") or rules ("policy") and, optionally a so-called chaining variable. The chaining variable (CV) may preferably be utilized to store at least temporarily an intermediate result or an initializing vector (IV) of a cryptographic function, for example for a block cipher in the so-called "chained mode". The selection of which set of key data 1432 is utilized for carrying out a particular cryptographic function by primary cryptography unit 1410, may preferably take place, for example, while controlling priority control device 1431. For this purpose, priority control device 1431, for example, may control a context selector 1433 (implemented, for example, by a demultiplexer) as a function of the content of control register 1461a, see data connection dv2, dv21. In other preferred specific embodiments, this ensures that a cryptographic key and, if necessary, a chaining variable is used that fits the selected key context.

In other words, key memory device 1430 in preferred specific embodiment implements a hardware-supported context switch between multiple key contexts. In this case, it is preferably possible that a dedicated cryptographic operation, in particular, an encryption operation, for example, AES operation, is carried out in each of the multiple key contexts. This takes place preferably independently of other key contexts and preferably in parallel to the other key contexts. This advantageously ensures that a rapid, dynamic (i.e. taking place during the run time of data processing device 100) switching of the cryptographic data processing by data processing device 100 between various security domains is possible.

Cryptographic functions according to standards other than AES are likewise conceivable in other specific embodiments.

Key memory device 1430 is designed, for example, to provide a corresponding cryptographic key for each possible cryptographic function of primary cryptography unit 1410, and optionally, if necessary, additional values for such purpose, such as, for example the previously described chaining variable and/or other intermediate results and the like, as a function of the desired cryptographic function.

The organization of key memory device 1430 in the form of so-called key contexts particularly preferably enables an efficient management of multiple cryptographic keys and of associated optional data such as, for example, the chaining variables. Each set of key data may further optionally include control data or at least one variable, which characterizes predefinable rules ("key policy") for the data processing, in particular, the carrying out of cryptographic functions. In particularly preferred specific embodiments, a set of key data therefore includes at least one cryptographic key of optional, additional data, for example, in the form of the chaining variables and of the rule data.

In other preferred specific embodiments, the key context is selectable both by computing device 110 as well as by hardware security module 130, hardware security module 130 preferably having a higher priority with respect to the selection of the key context. The access to a particular key context or the selection of a particular key context is controllable in preferred specific embodiments by aforementioned access and priority control device 1431. Access and priority control device 1431 may, for example, carry out the selection of a particular key context as a function of control register 1461a (predefinable by computing device 110 and or by hardware security module 130), 1461b (predefinable, in particular, exclusively by hardware security module 130).

In other preferred specific embodiments, cryptographic keys and/or associated control data may be written into key memory device 1430, preferably exclusively by hardware security module 130, see data connections dv4, dv41. As is apparent from FIG. 4, at least one register may optionally be provided for this purpose as a buffer memory or buffer 1462.

Figure 6:
FIG. 6 schematically shows a data structure according to one specific embodiment.

FIG. 6 schematically shows a data structure, as is useable, for example, by key memory device 1430 for storing, among others, the cryptographic keys. The data structure includes a first segment CV for receiving an optional chaining variable, a second segment KEY for receiving a cryptographic key, and a third segment POL for receiving optional rule data.

In other preferred specific embodiments, chaining variable CV of a key context is useable, in particular, for the two specific applications a), b) described in greater detail below.
  a) Initialization of the implementation of a cryptographic function, in particular, an AES operation, whereby the initialization may take place preferably by computing device 110,
  b) support for a chained AES operation.

According to other preferred specific embodiments, the following aspect may be applicable for the aforementioned initialization a) of the implementation of a cryptographic function. For some AES operating modes or operations, at least one initialization value is used, for example, a counter value in the AES counter mode and/or an initialization vector in the CBC mode or CMAC mode. In preferred specific embodiments, the aforementioned initialization value may be advantageously provided with the aid of a buffer, implemented preferably in the form of at least one register 1463, see also data connection dv5. For this purpose, computing device 110 may write the corresponding data into buffer 1463, for example, via first data bus 150. Buffer 1463 is connected preferably via a parallel data connection dv51 to a multiplexer 1434, which may also be referred to as a CV selector, because it implements the selection of different input data from buffers 1462 (via data connection dv41), 1463 (via data connection dv51) for storage in key memory device 1430.

Computing device 110 may further preferably trigger the transmission of the corresponding initialization values by a writing of control data into a corresponding control register 1461a. This process may optionally be monitored or controlled by access and priority control device 1431.

According to other preferred specific embodiments, the following aspects may be applicable for the aforementioned support for a chained AES operation (for example, CBC, CMAC for data or messages, the length of which exceeds a predefinable maximum length of, for example, approximately 16 bytes). Chaining variable CV (FIG. 6) may be advantageously utilized for storing intermediate results for a subsequent AES operation. A dynamic switch to another key context, even in AES operations that are not already completed, but of which, for example, an intermediate value is present, is advantageously particularly preferably required based on the principle of the context switch between multiple key contexts enabled by the previously described specific embodiments. In this case, the corresponding intermediate result may be stored in chaining variable CV. The key context may then be switched in order to enable a cryptographic function to be carried out on another key context. If necessary, the previously processed key context may later be switched back to, the intermediate result stored in chaining variable CV being taken up and further processed. The aforementioned specific embodiments thus advantageously implement a completely hardware-supported switch between various key contexts, in particular, in which an interaction on the part of hardware security module 130 would be not necessary.

In other preferred specific embodiments, it is also conceivable to also extend the principle of the switching of the key context by hardware security module 130 or by corresponding software. For this purpose, it may be advantageously provided that chaining variable CV may be read in by hardware security module 130, for example, using another data buffer 1464 which, in turn, includes at least one register. Chaining variable CV may thus be transmitted from key memory device 1430 to hardware security module 130 using data connections dv6, dv61 and second data bus 150a. This enables chaining variable CV or intermediate results for at least one key context included therein to be at least temporarily stored via hardware security module 130 in the form of software (for example, controlling of hardware security module 130 by a computer program executed on computing device 110), and to continue the corresponding AES operation on the corresponding key context at another point in time, by loading the at least temporarily buffered intermediate results in the form of software again into chaining variable CV of the relevant key context of key memory device 1430.

In other preferred specific embodiments, cryptography module 1400a is advantageously designed to support at least approximately 30 different key contexts, each key context being characterizable preferably by the data structure depicted by way of example in FIG. 6 (including, by way of example, an optional chaining variable CV, a cryptographic key KEY, and optional rule data POL). The aforementioned key contexts in other specific embodiments may be utilized particularly advantageously simultaneously or pseudo-simultaneously by cryptography module 1400a, i.e. in particular, without requiring a renewed configuration of corresponding key contexts by another component 110, 130.

In other preferred specific embodiments, cryptographic keys or entire data structure CV, KEY, POL are stored in a volatile memory, in particular, in a working memory (RAM), so that a preferably complete data loss occurs with respect to the aforementioned keys or data structure when data processing device 100 or cryptography module 1400a is reset or the electrical power supply is interrupted.

Write accesses, which involve the transmission of cryptographic keys KEY and/or of chaining variables CV into key memory device 1430 may be particularly preferably carried out exclusively by hardware security module 130, for example, using secondary data bus 150*a*, as a result of which the security of cryptography module 1400*a* is further increased. This prevents, in particular, an attacker from transmitting counterfeit cryptographic keys into key memory device 1430 while exploiting first data bus 150, for example, by using compromised software for computing device 110.

In other preferred specific embodiments, it may be provided that a read access to key memory device 1430 (in particular, by a component other than hardware security module 130) supplies a predefinable fixed value, but not the actual content of the key context or at least of one element CV, KEY, POL of the stored data structure.

In other preferred specific embodiments, it is provided that hardware security module 130 (in particular, alone) has read access to chaining variable CV, see data connections dv6, dv61, 150*a*, which enables, among others, the software-supported context switch previously described above.

In other preferred specific embodiments, it is provided that the selection of a key context is possible both on the part of computing device 110 (see data connection dv2) as well as on the part of hardware security module 130 (see data connection dv7), a prioritization taking place preferably by access and priority control device 1431.

In other specific embodiments, a selected key context is particularly preferably useable for each cryptographic function, which may be carried out by primary cryptography unit 1410 and/or by the processing unit, in particular, comparator unit, 1420.

In other preferred specific embodiments, it is provided that a result of the implementation of the cryptographic function by primary cryptography unit 1410 is stored at least temporarily in an output data buffer 1471*b*. Output data buffer 1471*b* is preferably designed as a register or register memory.

Optionally, the result of the implementation of the first cryptographic function by primary cryptography unit 1410 may also be transmitted to the processing unit, in particular, comparator unit 1420, see data connection dv3. Data connection dv3 is preferably a parallel data connection as well as data connections dv2, dv21.

In preferred specific embodiments, the processing unit, in particular, comparator unit 1420 according to FIG. 4, may be designed, for example, similar to unit 1420 according to FIG. 2, i.e. for carrying out, for example, a comparison.

In preferred specific embodiments, the processing unit, in particular, comparator unit 1420, includes a CMAC (Cipher-based Message Authentication Code) memory unit 1422 and a comparator unit 1424. The functionality of the processing unit, in particular, comparator unit 1420, may therefore also be described in these specific embodiments as "CMAC Compare".

CMAC memory unit 1422 is designed by way of example to at least temporarily buffer CMAC values obtained with the aid of primary cryptography module 1410, see data connection dv3.

Comparator unit 1424 is further preferably designed to compare a first truncated CMAC value with a second, calculated CMAC value, as it is obtained by primary cryptography module 1410 and buffered in CMAC memory unit 1422. Comparator unit 1424 is preferably initially configured before such a comparison. The configuration may, for example, include the information which bits of the second, calculated CMAC value correspond to the first truncated CMAC value.

In other preferred specific embodiments, the start of a comparison may then be initiated by comparator unit 1424, for example, when primary cryptography module 1410 has completed the calculation of the second CMAC value (this may be signaled, for example by computing device 110, for example, with the aid of the "last block") and when the calculated CMAC value has been written into CMAC memory unit 1422.

In other preferred specific embodiments, a result of the comparison by comparator unit 1424 is storable in a data buffer 1465, which is designed preferably as a register.

According to one preferred specific embodiment, the following approach is provided for carrying out the comparison with the aid of comparator unit 1424. Initialization of the processing unit, in particular, comparator unit 1420 or comparator unit 1424 with a start bit position and a length of the first truncated CMAC value. Computing device 110 is preferably designed to copy the first truncated CMAC value into data buffer 1466 (designed again preferably as a register) before a comparison is carried out with the aid of comparator unit 1424, see data connection dv8. The first truncated CMAC value is particularly preferably stored in data buffer 1466 aligned at byte boundaries ("bytewise aligned"). This may, if necessary, be effectuated by computing device 110, if required (if, for example, such an alignment at the corresponding byte boundaries does not already exist). The configuration according to the above described specific embodiments may be particularly simply and efficiently carried out by computing device 110, for example, with the aid of a simple memory access (memory copying), which may preferably even be carried out in a hardware-supported manner.

According to another preferred specific embodiment, the following approach is provided for carrying out the comparison with the aid of comparator unit 1424. Comparator unit 1424 is initialized with the aid of a bit mask stored in an optional additional data buffer 1477. In preferred specific embodiments, such bits in the bit mask corresponding to those of the first truncated CMAC value are set (value "1"), and the remaining bits are reset or not set (value "0"). In these specific embodiments, computing device 110 accordingly extends the first truncated CMAC value as a function of the bit mask to its full length, corresponding to a calculated CMAC value, with the bit width as it is provided, for example, by primary cryptography module 1410, and stores the value obtained in this way in data buffer 1466. These specific embodiments enable a particularly high level of flexibility and a comparatively less complex implementation on the hardware side.

In other preferred specific embodiments, an interrupt request control unit 1440 is provided, which makes it possible to respond to events that are signalable or characterizable by interrupt requests during the operation of data processing device 100, in particular, cryptography module 1400*a*. In preferred specific embodiments, at least one of the following events may be taken into consideration by interrupt request control unit 1440 and optionally signaled to another unit, for example, to hardware security module 130, see data connection 1442: completion of the implementation of a cryptographic function, for example, of an AES operation (for example, by primary cryptography unit 1410), completion of the implementation of a cryptographic function or of a comparison by the processing unit, in particular, comparator unit 1420 (for example, comparison of a truncated and calculated CMAC value). Primary cryptography unit 1410 may signal such an interrupt request, for example, with the aid of signal 1410*a*, and the processing unit, in particular, comparator unit 1420 may signal such an interrupt request, for example, with the aid of signal 1420*a*. Dedicated data connections 1442 are particularly preferably present for signaling the interrupt requests to hardware security module 130 and/or to computing device 110 (FIG. 1). The signaling may further preferably also be configurably designed, for example, controllable with the aid of software. In another preferred specific embodiment, interrupt request control unit 1440 accordingly includes dedicated configuration registers and/or status registers which, for the sake of clarity, are not depicted in FIG. 4.

In other preferred specific embodiments, a rule monitoring unit 1450 is provided. It is designed to check whether, for example, an implementation of a cryptographic function by primary cryptography unit 1410 prompted by computing device 110 complies with the rule or the rules that are predefined or allowed by the rule data POL (FIG. 6) of the instantaneously active key context. If this is the case, an implementation of a cryptographic function is approved by primary cryptography unit 1410 by rule monitoring unit 1450, see the arrow from unit 1450 to unit 1410 not further identified in FIG. 4. Otherwise the implementation of the cryptographic function by primary cryptography unit 1410 may be blocked or prevented by rule monitoring unit 1450. A corresponding state of rule monitoring unit 1450 or primary cryptography unit 1410 in other preferred specific embodiments may be stored in a register, for example, in control register 1461*a*. In other preferred specific embodiments, rules are also conceivable, such that the output of results of the evaluation of a cryptographic function by primary cryptography unit 1410 to data buffer 1471*b* is suppressed, see data connection dv9 and symbolic switch dv9*a*.

In other preferred specific embodiments, the interfaces between cryptography module 1400*a* or its components 1410, 1420, 1430, 1440, 1450 and other components 110, 130 of data processing device 100 (FIG. 1) are implemented by the registers or buffers at least partially described above.

Additional advantageous specific embodiments, which relate to interfaces between hardware security module 130 and cryptography module 1400*a*, are described below.

At least one control register may preferably be provided, which is accessible preferably exclusively by hardware security module 130, see, for example, reference numeral 1461*b*. This control register is usable, for example, for enabling a selection of a key context for the implementation of subsequent cryptographic functions by cryptography module 1400*a* with the aid of hardware security module 130.

A register 1462 may be further preferably provided in order to transmit cryptographic keys and/or chaining values CV from hardware security module 130 into key memory device 1430 and/or in order to transmit chaining values CV from key memory device 1430 into hardware security module 130.

An additional register 1464 may be further preferably provided, which may only be read out by hardware security module 130, for example, for the purpose of reading out chaining values CV from key memory device 1430. In this way, a context switch with software support may be advantageously supported by hardware security module 130.

Additional advantageous specific embodiments, which relate to interfaces between computing device 110 and cryptography module 1400*a*, are described below.

A control register 1461*a* is preferably provided, which may be accessed by computing device 110, see data connection 150, 1461*a*′. An access of hardware security module 130 to control register 1461*a* is optionally also possible via this data connection.

Control register 1461*a* may also be utilized for selecting a key context, which is to be used for the implementation of cryptographic functions by cryptography module 1400*a*. To select a corresponding key context, computing device 110 may, for example, write corresponding control data into control register 1461*a*.

Control register 1461*a* may also be utilized for selecting one or multiple cryptographic functions, which are to be carried out by cryptography module 1400*a* or by its primary cryptography unit 1410 and/or by the processing unit, in particular, comparator unit 1420, for example, the various AES operating modes previously described multiple times above.

Control register 1461*a* may also be used for at least temporarily storing an internal status or an operating state of cryptography module 1400*a* or of at least one component 1410, 1420 thereof.

An additional register 1463 may preferably also be provided, which is useable for inputting values for a chaining variable CV, for example, as a buffer for transmitting a value for a chaining variable from computing device 110 to key memory device 1430.

An additional register 1471*a* may preferably also be provided, which is useable for inputting input data for the implementation of the cryptographic function(s) with the aid of primary cryptography unit 1410. Accordingly, computing device 110 may write corresponding input data into register 1471*a*, see data connection 1471*a*′.

An additional register 1471*b* may preferably also be provided, which is useable for outputting output data of primary cryptography unit 1410. Computing device 110 may, for example, have read access to additional register 1471*b* in order to load the output data. As previously described above, it may be provided in some specific embodiments that the output data are written into register 1471*b* only if corresponding rules exist.

Additional aspects and specific embodiments, which involve a secured communication using data processing device 100 or its cryptography module 140, 1400, 1400*a*, are described by way of example below.

In some specific embodiments, an initialization phase for the secured communication may be provided. In the initialization phase, hardware security module 130 may transmit key contexts for one or multiple communication domains into cryptography module 1400*a*, corresponding cryptographic keys and/or optional additional data, such as chaining values CV or optional rules POL being provided, for example.

Once a message is received, for example, by computing device 110 or by one of its associated communication interfaces (not shown) with the aid of a communication channel, computing device 110 may select the corresponding key context for this received message, for example, by writing corresponding control data into register 1461*b*. A corresponding configuration of comparator unit 1424 may take place in a comparative manner and an input of the received message into buffer 1471*a* and an input of the truncated CMAC value of the received message into buffer 1466. For this purpose, it may be expedient in other specific embodiments to divide the received message into a payload data portion (payload) and a CMAC portion by computing device 110. Computing device 110 in other preferred specific embodiments may then initiate the implementation of the relevant cryptographic function (for example, forming the CMAC value for the received message) by cryptography module 1400a or by primary cryptography unit 1410, for example, by writing corresponding control data into control register 1461a. After implementation, comparator unit 1424 may compare the CMAC value formed during implementation with the truncated CMAC value of the received message.

In other preferred specific embodiments, the comparison result, if necessary, together with a key context or with a value identifying the key context, optionally also a status code (which characterizes, for example, a successful comparison or a failed comparison) may be written into register 1465 and may then be read in by computing device 110. The provision of the comparison result may be signaled in other preferred specific embodiments by an interrupt request 1420a, which is forwardable by unit 1440 to, among others, computing device 110, see data connection 1442.

In other specific embodiments, in which, for example, a message is to be sent by data processing device 100 or its computing device 110 to another unit (not shown), the following steps may be carried out. Computing device 110 may preferably select a key context corresponding to the security domain to be chosen for the message to be sent, in order to enable a suitable CMAC value to be ascertained by cryptography module 1400a. In other specific embodiments, computing device 110 may then transmit the message to be sent into input buffer 1471a and trigger the corresponding AES operation (in the present case, for example, ascertaining the CMAC value for the message or corresponding data present in input buffer 1471a), for example, by writing corresponding control data into control register 1461a.

In other specific embodiments, the ascertained CMAC value may be stored in output buffer 1471b after the AES operation is carried out (in the present case, for example, ascertainment of the CMAC value of the message to be sent) which, in turn, is advantageously signalable by an interrupt request 1410a.

Subsequently, computing device 110 in other specific embodiments may format the message to be sent (in particular, while adding the CMAC value ascertained as described above) and may deliver it to a communication interface to be sent out.

In other preferred specific embodiments, it is further conceivable that the implementation of a comparatively long cryptographic function by the cryptography module is interruptible by one or multiple other, for example, comparatively shorter, cryptographic functions. This is advantageously supported by the above described key contexts, either hardware-supported, for example, by cryptography module 1400a and/or hardware-supported and, if necessary, software-supported, for example, using hardware security module 130 with partially software-based control by computing device 110.

In other advantageous specific embodiments, it is also conceivable that computing device 110 includes multiple processor cores, each of which are able to interact with cryptography module 1400a in the manner described by way of example above. It is conceivable, for example, that each of the multiple processor cores maintains different communication processes in, for example, two different security domains and for this purpose utilizes different key contexts supported by cryptography module 1400a.

In other advantageous specific embodiments, the functionality provided by cryptography module 1400a may be advantageously scaled by providing identical or similar cryptography modules (not shown) and, for example, connecting them to hardware security module 130 with the aid of second data bus 150a and/or of at least one separate additional data bus.

Figure 5:
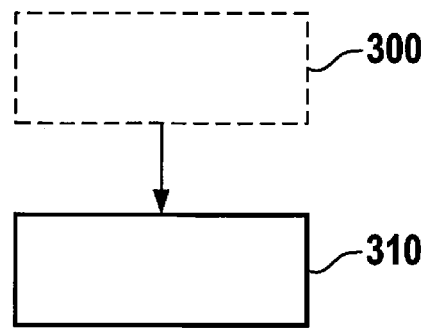
FIG. 5 schematically shows a simplified flow chart of a method according to one specific embodiment.

FIG. 5 schematically shows a simplified flow chart of a method according to one specific embodiment. In a first optional step 300, control computing device 110 (FIG. 1) configures cryptography module 140, 1400, 1400a, for example, by transmitting or writing corresponding control data into one or multiple registers of the cryptography module. In a subsequent second step 310, the cryptography module carries out at least one first cryptographic function, for example, the formation of a CMAC value of input data provided.

The principle according to the specific embodiments advantageously enables a flexible and efficient operation of data processing device 100, in particular, with respect to the implementation of cryptographic functions. The data processing device according to the specific embodiments may be advantageously utilized for the efficient cryptographic safeguarding and/or checking of data, for example, of messages received or to be sent, for example, by forming or checking corresponding CMAC values and the like. Only a comparatively minimal load for hardware security module 130 is particularly advantageously formed even in the case of a high communication load for data processing device 100 or its computing device 110, since essential portions of the implementation of the cryptographic functions may be efficiently taken over by the at least one cryptography module 140, 1400, 1400a. In other preferred specific embodiments, the actual calculation of cryptographic functions may particularly advantageously take place without an active involvement of hardware security module 130, without harming an integrity of domains (security and safety) in the process. In this case, it may be advantageously provided that hardware security module 130 essentially carries out configuration tasks, but not the active implementation of cryptographic functions themselves.

The specific embodiments result in a significant increase with respect to flexibility and performance compared to conventional data processing devices, whereby the requirements of the safety domains (ISO26266) may be additionally advantageously met separately from the security domain.

An additional advantage of the present specific embodiments is that pieces of information for carrying out the cryptographic functions (for example, calculation of a fingerprint or of a CMAC value and the like), are useable (for example, length of a message, length of the fingerprint, freshness counter, verification/generation, etc.), and which may be preferably managed by computing device 110, may be transmitted directly from computing device 110 to the cryptography module, in particular, without initially transmitting the relevant data or pieces of information to hardware security module 130.

The principle according to the specific embodiments is advantageously conceivable for all target systems of the data processing device such as, for example, control units, in which cryptographic functions are utilized. The principle according to the specific embodiments is particularly advantageously useable for control units, which carry out a secured communication with numerous communication relationships.

What is claimed is:

1. A data processing device, comprising:
   at least one computing device;
   a memory device;

a hardware security module;
at least one cryptography module; and
a first data bus for exchanging data among the at least one computing device, the memory device, the hardware security module, and the at least one cryptography module, wherein the at least one cryptography module includes a first data interface for exchanging data via the first data bus, wherein the at least one cryptography module includes a second data interface that bypasses the first data bus and is for directly exchanging data with the hardware security module, wherein the at least one cryptography module includes a primary cryptography unit for carrying out at least one first cryptographic function, and wherein the first cryptographic function includes CMAC, Cipher-Based Message Authentication Code, and wherein the at least one cryptography module is configured to compare a first truncated CMAC value with a second, calculated CMAC value.

2. The data processing device as recited in claim 1, wherein the at least one cryptography module includes hardware circuitry, and wherein the at least one cryptography module is externally to the hardware security module.

3. The data processing device as recited in claim 1, wherein the at least one cryptography module includes at least one of the following components:
   a processing unit,
   a key memory device for at least temporarily storing cryptographic keys,
   an interrupt request control unit,
   a rule monitoring unit,
   a control register,
   a status register, and
   data buffers.

4. The data processing device as recited in claim 3, wherein the processing unit includes a comparator unit for carrying out at least one second cryptographic function.

5. The data processing device as recited in claim 3, wherein the first cryptographic function includes at least one of the following elements:
   a) AES algorithm,
   b) ECB, Electronic code book mode,
   c) CBC, Cipher block chaining mode,
   d) CTR, Counter mode,
   e) OFB, Output feedback mode,
   f) CFB, Cipher feedback mode, and
   g) GCM, Galois counter mode.

6. The data processing device as recited in claim 1, further comprising a second data bus via which the hardware security module exchanges data with the at least one cryptography module.

7. A method for operating a data processing device, the data processing device including at least one computing device, a memory device, a hardware security module, and at least one cryptography module, the method comprising:
   carrying out, by the cryptography module, at least one first cryptographic function, wherein the at least one cryptography module includes a first data interface for exchanging data via a first data bus of the data processing device and a second data interface that bypasses the first data bus and is for directly exchanging data with the hardware security module, wherein the first cryptographic function includes CMAC, Cipher-Based Message Authentication Code; and
   comparing a first truncated CMAC value with a second, calculated CMAC value.

8. The method as recited in claim 7, wherein the cryptography module carries out the first cryptographic function in parallel to an operation of the hardware security module.

9. The method as recited in claim 7, wherein the cryptography module carries out the first cryptographic function independently of the hardware security module.

10. The method as recited in claim 7, wherein the first cryptographic function includes at least one of the following elements:
    a) AES algorithm,
    b) ECB, Electronic code book mode,
    c) CBC, Cipher block chaining mode,
    d) CTR, Counter mode,
    e) OFB, Output feedback mode,
    f) CFB, Cipher feedback mode, and
    g) GCM, Galois counter mode.

11. A control unit, comprising:
    at least one data processing device that includes:
      at least one computing device;
      a memory device;
      a hardware security module;
      at least one cryptography module; and
      a first data bus for exchanging data among the at least one computing device, the memory device, the hardware security module, and the at least one cryptography module, wherein the at least one cryptography module includes a first data interface for exchanging data via the first data bus, wherein the at least one cryptography module includes a second data interface that bypasses the first data bus and is for directly exchanging data with the hardware security module, wherein the at least one cryptography module includes a primary cryptography unit for carrying out at least one first cryptographic function, and wherein the first cryptographic function includes CMAC, Cipher-Based Message Authentication Code, and wherein the at least one cryptography module is configured to compare a first truncated CMAC value with a second, calculated CMAC value.

12. The data processing device as recited in claim 1, wherein the data processing device is for a control unit.

13. The method as recited in claim 7, wherein the data processing device is for a control unit.

14. The data processing device as recited in claim 1, wherein the computing device and the memory device are incapable of accessing the second data interface.

15. The method as recited in claim 7, wherein the computing device and the memory device are incapable of accessing the second data interface.

16. The control unit as recited in claim 11, wherein the computing device and the memory device are incapable of accessing the second data interface.

\* \* \* \* \*